(12) United States Patent
Dropps et al.

(10) Patent No.: US 9,282,000 B1
(45) Date of Patent: Mar. 8, 2016

(54) NETWORK DEVICES HAVING CONFIGURABLE RECEIVE PACKET QUEUES AND RELATED METHODS

(71) Applicant: QLOGIC Corporation, Aliso Viejo, CA (US)

(72) Inventors: Frank R. Dropps, Maple Grove, MN (US); Craig M. Verba, Maple Grove, MN (US); Leo J. Slechta, Jr., Eagan, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 0 days.

(21) Appl. No.: 14/749,964

(22) Filed: Jun. 25, 2015

Related U.S. Application Data

(62) Division of application No. 13/678,367, filed on Nov. 15, 2012, now Pat. No. 9,071,559.

(51) Int. Cl.
*H04L 12/28* (2006.01)
*H04L 12/54* (2013.01)
*H04L 12/24* (2006.01)
*H04L 12/861* (2013.01)
*H04L 12/935* (2013.01)

(52) U.S. Cl.
CPC ............ *H04L 41/0803* (2013.01); *H04L 49/30* (2013.01); *H04L 49/90* (2013.01)

(58) Field of Classification Search
CPC .................. H04Q 11/0066; H04Q 2011/0086; H04L 49/253–49/255; H04L 49/30; H04L 49/302–49/308; H04L 49/90; H04L 49/901–49/9094
USPC ................. 370/411–423, 428–429, 463, 391, 370/395.4–395.43
See application file for complete search history.

(56) References Cited

U.S. PATENT DOCUMENTS

| | | | | |
|---|---|---|---|---|
| 7,197,576 B1* | 3/2007 | Lo | ........................... | H04L 29/06 710/2 |
| 7,684,388 B2* | 3/2010 | Beshai | ............... | H04Q 11/0005 370/360 |
| 7,856,026 B1* | 12/2010 | Finan | .................... | H04L 49/103 370/412 |
| 2002/0172195 A1 | 11/2002 | Pekkala et al. | | |
| 2003/0112819 A1* | 6/2003 | Kofoed | ...................... | H04J 3/12 370/431 |
| 2004/0228340 A1* | 11/2004 | Akella | .................... | H04L 49/30 370/386 |
| 2005/0281282 A1* | 12/2005 | Gonzalez | .............. | G06F 13/387 370/422 |
| 2013/0315054 A1* | 11/2013 | Shamis | ................... | H04L 47/58 370/225 |

OTHER PUBLICATIONS

"Notice of Allowance from USPTO dated Apr. 2, 2015 for U.S. Appl. No. 13/678,367".

* cited by examiner

*Primary Examiner* — Thai Hoang
(74) *Attorney, Agent, or Firm* — Klein, O'Neill & Singh, LLP

(57) ABSTRACT

Method and system for configuring a port of a network device are provided. One method for a port of a network device communicating with another network device port includes reading manufacturing, license and user provided port configuration data by a processor of the network device; obtaining capabilities information for the port by the processor of the network device from an external pluggable media device; setting port configuration data based on the capabilities information obtained from the external pluggable media; executing auto-negotiation on the port, when enabled and obtaining configuration data from the other port; determining that enough data is available to set port configuration; attempting to configure the port by using a highest permissible bandwidth configuration when enough data is available to set the port configuration; and setting port configuration based on the attempt to configure the port to operate when a link connected to the port is operational.

20 Claims, 8 Drawing Sheets

NETWORK DEVICES HAVING CONFIGURABLE RECEIVE PACKET QUEUES AND RELATED METHODS

CROSS-REFERENCE TO RELATED APPLICATION

This application is a divisional of U.S. application Ser. No. 13/678,367, filed on Nov. 15, 2012, the contents of which are hereby incorporated by reference in its entirety.

BACKGROUND

1. Technical Field

The present embodiments relate to networks and network devices.

2. Related Art

Networking systems are commonly used to move network information (which may also be referred to interchangeably, as frames, packets or commands) between computing systems (for example, servers) or between computing systems and network devices (for example, storage systems). Various hardware and software components are used to implement network communication. A network switch is typically a multi-port network device where each port manages a point-to-point connection between itself and an attached system. Each port can be attached to a server, peripheral, input/output subsystem, bridge, hub, router, or another switch, where each of the aforementioned network devices also has one or more ports.

A network switch typically receives data packets and forwards the packets to their destinations. The packets are stored temporarily in buffers (storage locations) before being forwarded to the next destination. Each buffer includes a number of receive queues. A typical network switch has a fixed number of receive queues, each with a fixed size. This arrangement does not allow for efficient use of receive buffers.

SUMMARY

The present embodiments have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

The present embodiments include the realization that fixed numbers of receive queues, each with a fixed size, do not allow for efficient use of receive buffers. The present embodiments provide solutions to this problem.

In one embodiment, a machine-implemented method for configuring a receive packet queue in a network device is provided. The method includes determining how many sub-ports of a port of the network device are configured; wherein the port includes a plurality of sub-ports configured to operate as independent ports for sending and receiving packets using one of a plurality of network links at a plurality of rates and complying with a plurality of protocols; assigning memory to each of the configured sub-ports based on the determination of how many sub-ports are configured; determining a flow control scheme to be used for packet transmission; and dividing the receive packet queue based on the determination of the flow control scheme to be used.

In another embodiment, a machine-implemented method for gathering port configuration data in a network device is provided. The method includes determining if any manufacturing port configuration data is available from a time when the network device was manufactured; when the manufacturing port configuration data is available, updating memory accessible to the network device with the manufacturing port configuration data; determining if any port license configuration data is available; when the port license configuration data is available, updating the memory with the port license configuration data; determining if any user-entered port configuration data is available; and when the user-entered port configuration data is available, updating the memory with the user-entered port configuration data.

In yet another embodiment, a machine-implemented method for setting a port configuration for a port in a network device is provided. The method includes reading manufacturing, license, and user port configuration data, if available; determining if an external pluggable media is present; when the external media device is present, reading capabilities information of the pluggable media device; based on the capabilities information, setting port configuration data; determining if auto-negotiation is enabled; when auto-negotiation is enabled, executing auto-negotiation and obtaining port configuration data from negotiating ports; determining if enough data is available to set the port configuration; when enough data is available to set the port configuration, attempting to configure the port to operate by using a highest bandwidth configuration that is allowed based on the data; determining if a link connected to the port is operational; and when a link connected to the port is operational, setting the port configuration based on the attempt to configure the port to operate.

This brief summary has been provided so that the nature of the invention may be understood quickly. A more complete understanding of the present disclosure can be obtained by reference to the following detailed description of the preferred embodiments thereof concerning the attached drawing.

BRIEF DESCRIPTION OF THE DRAWINGS

The various present embodiments now will be discussed in detail with an emphasis on highlighting the advantageous features. These embodiments depict the novel and non-obvious network devices having configurable receive packet queues and related methods shown in the accompanying drawings, which are for illustrative purposes only. These drawings include the following figures, in which like numerals indicate like parts:

FIG. 1 is a functional block diagram of a network that the present embodiments may be used in connection with;

DETAILED DESCRIPTION

Figure 1:
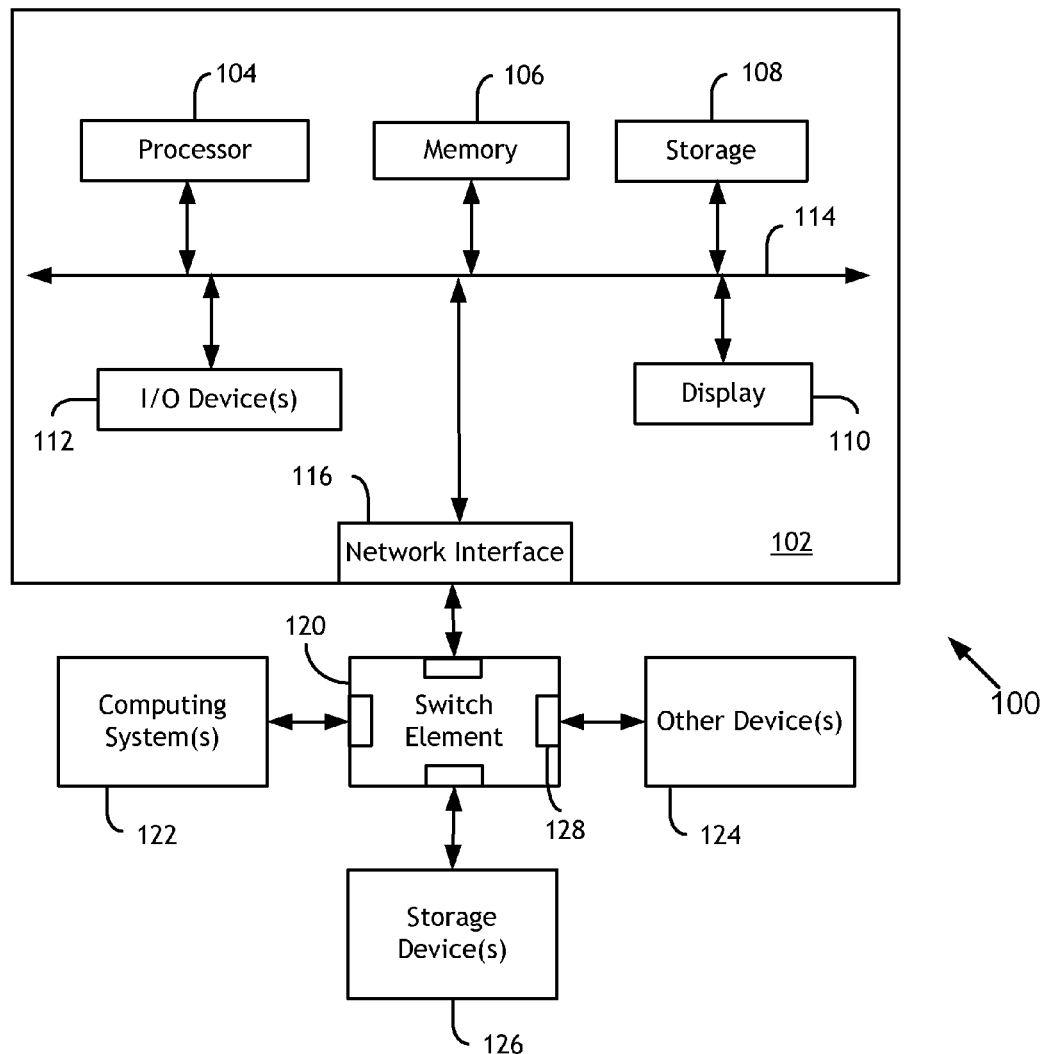

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system" and "functionality," as used herein, generally represent software, firmware, hardware, or a combination of these elements. For instance, in the case of a software implementation, the terms "logic," "module," "component," "system," and "functionality" represent program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory medium for retaining information in any form, including various kinds of storage devices (magnetic, optical, static, etc.). Machine-readable media may also encompass transitory forms for representing information, including various hardwired and/or wireless links for transmitting the information from one point to another.

The embodiments disclosed herein, may be implemented as a computer process (method), a computing system, or as an article of manufacture, such as a computer program product or non-transitory, computer-readable media. The computer program product may be non-transitory, computer storage media, readable by a computer device, and encoding a computer program of instructions for executing a computer process.

Various network standards and protocols may be used to enable network communications, including Fibre Channel (FC), Fibre Channel over Ethernet (FCoE), Ethernet, and others. Below is a brief introduction to some of these standards. The present embodiments are described herein with reference to the Fibre Channel and Ethernet protocols. However, these protocols are used merely for ease of reference and to provide examples. The present embodiments are not limited to Fibre Channel and Ethernet.

Fibre Channel (FC) is a set of American National Standards Institute (ANSI) standards. Fibre Channel provides a serial transmission protocol for storage and network protocols such as HIPPI, SCSI, IP, ATM and others. Fibre Channel provides an input/output interface to meet the requirements of both Channel and network users. The Fibre Channel standards are incorporated herein by reference in their entirety.

Fibre Channel supports three different topologies: point-to-point, arbitrated loop and Fibre Channel Fabric. The point-to-point topology attaches two devices directly. The arbitrated loop topology attaches devices in a loop. The Fabric topology attaches computing systems directly to a Fabric, which are then connected to multiple devices. The Fibre Channel Fabric topology allows several media types to be interconnected.

A Fibre Channel switch is a multi-port device where each port manages a point-to-point connection between itself and its attached system. Each port can be attached to a server, peripheral, I/O subsystem, bridge, hub, router, or even another switch. A switch receives messages from one port and routes them to other ports. Fibre Channel switches use memory buffers to hold frames received and sent across a network. Associated with these buffers are credits, which are the number of frames that a buffer can hold per Fabric port.

Ethernet is a family of computer networking technologies for local area networks (LANs). Systems communicating over Ethernet divide a stream of data into individual packets called frames. Each frame contains source and destination addresses and error-checking data so that damaged data can be detected and re-transmitted. Ethernet is standardized in IEEE 802.3, which is incorporated herein by reference in its entirety.

Fibre Channel over Ethernet (FCoE) is a converged network and storage protocol for handling both network and storage traffic. The FCoE standard enables network adapters and network switches to handle both network and storage traffic using network and storage protocols. Under FCoE, Fibre Channel frames are encapsulated in Ethernet frames. Encapsulation allows Fibre Channel to use 1 Gigabit Ethernet networks (or higher speeds) while preserving the Fibre Channel protocol.

The systems and processes described below are applicable and useful in the upcoming cloud computing environment. Cloud computing pertains to computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information, to be available, on-demand, like a public utility.

Typical cloud computing providers deliver common business applications online, which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud. After the application layer is a cloud platform and cloud infrastructure, followed by a "server" layer that includes hardware and computer software designed for cloud-specific services.

FIG. 1 shows an example of a system 100 that may be used in connection with the present embodiments. System 100 may include a computing system 102, which may be referred to as a host system. A typical host system 102 includes several functional components, including a central processing unit (CPU) (also referred to as a processor/processors or processing module) 104, a host memory (or main/system memory) 106, a storage device 108, a display 110, input/output ("I/O") device(s) 112, and other components (or devices). The host memory 106 is coupled to the processor 104 via a system bus or a local memory bus 114. The processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware-based devices.

The host memory 106 provides the processor 104 access to data and program information that is stored in the host memory 106 at execution time. Typically, the host memory 106 includes random access memory (RAM) circuits, read-only memory (ROM), flash memory, or the like, or a combination of such devices.

The storage device 108 may comprise one or more internal and/or external mass storage devices, which may be or may include any conventional medium for storing large volumes of data in a non-volatile manner. For example, the storage device 108 may include conventional magnetic disks, optical disks such as CD-ROM or DVD-based storage, magneto-optical (MO) storage, flash-based storage devices, or any other type of non-volatile storage devices suitable for storing structured or unstructured data.

The host system 102 may also include a display device 110 capable of displaying output, such as an LCD or LED screen and others, and one or more input/output (I/O) devices 112, for example, a keyboard, mouse, etc. The host system 102 may also include other devices/interfaces for performing various functions, details of which are not germane to the inventive embodiments described herein.

The host system 102 also includes a network interface 116 for communicating with other computing systems 122, storage devices 126, and other devices 124 via a switch 120 and various links. The network interface 116 may comprise a network interface card (NIC) or any other device for facilitating communication between the host system 102, other computing systems 122, storage devices 126, and other devices 124. The network interface 116 may include a converged network adapter, such as that provided by QLogic Corporation for processing information complying with storage and network protocols, for example, Fibre Channel and Ethernet. As an example, the network interface 116 may be a FCoE adapter. In another embodiment, the network interface 116 may be a host bus adapter, for example, a Fibre Channel host bus adapter, such as that provided by QLogic Corporation. Details regarding the network interface 116 are not provided since they are not germane to the inventive embodiments described herein.

In one embodiment, processor 104 of the host system 102 may execute various applications, for example, an e-mail server application, databases, and other application types. Data for various applications may be shared between the computing systems 122 and stored at the storage devices 126. Information may be sent via switch 120 ports. The term port as used herein includes logic and circuitry for receiving, processing, and transmitting information.

Each device (e.g. the host system 102, the computing systems 122, the storage devices 126, and the other devices 124) may include one or more ports for receiving and transmitting information, for example, node ports (N_Ports), Fabric ports (F_Ports), and expansion ports (E_Ports). Node ports may be located in a node device, e.g. network interface 116 of host system 102 and at an adapter (not shown) for the storage devices 126. Fabric ports are typically located in Fabric devices, such as the switch 120. Details regarding switch 120 are provided below.

Figure 2A:
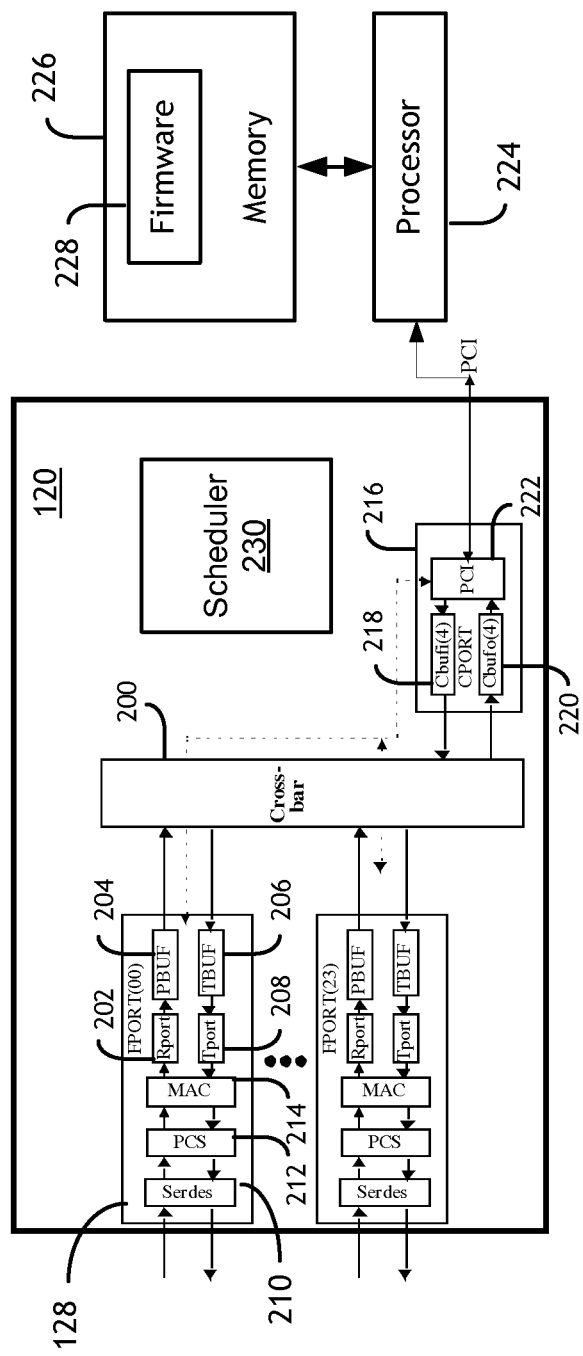
FIG. 2A is a functional block diagram of a switch according to the present embodiments.

FIG. 2A is a high-level block diagram of the switch 120, also referred to as the switch element 120. Switch element 120 may be implemented as an application specific integrated circuit (ASIC) having a plurality of ports 128. The ports 128 are generic (GL) and may include an N_Port, F_Port, FL_Port, E_Port, or any other port type. The ports 128 may be configured to operate as FCoE, FC or Ethernet ports. In other words, depending upon what it is attached to, each GL port can function as any type of port. As an example, the ports 128 of FIG. 2A are drawn on the same side of the switch element 120. However, the ports 128 may be located on any or all sides of switch element 120. This does not imply any difference in port or ASIC design. The actual physical layout of the ports will depend on the physical layout of the ASIC.

The ports 128 communicate via a crossbar 200, which includes a plurality of switch crossbars for handling specific types of data and data flow control information. For illustration purposes only, the switch crossbar 200 is shown as a single crossbar. The switch crossbar 200 may be a connectionless crossbar (packet switch) of conventional design, sized to connect a plurality of paths. This is to accommodate the ports 128 plus a port 216 for connection to a processor 224 that may be external to the switch element 120. In another embodiment, the processor 224 may be located within a switch chassis that houses the switch element 120.

Each port 128 receives incoming frames (or information) and processes the frames according to various protocol requirements. The port 128 includes a shared pipeline for receiving frames (or information). The pipeline includes a serializer/deserializer (SERDES) 210, a physical coding sub-layer (PCS) 212, and a media access control (MAC) sub-layer 214. The SERDES 210 receives incoming serial data and converts it to parallel data. The parallel data is then sent to the PCS 212 and the MAC 214 before being sent to a receive segment (or receive port (RPORT) 202.

The RPORT 202 temporarily stores received frames at a memory storage device, shown as PBUF (pause buffer) 204. The frames are then sent to a transmit segment (or transmit port (TPORT)) via the crossbar 200 and a transmit buffer (TBUF) 206. The TBUF 206 is a temporary memory storage device where frames or information related to frames are staged before being transmitted.

The switch element 120 may also include a control port (CPORT) 216 that communicates with the processor 224. The CPORT 216 may be used for controlling and programming the switch element 120. In one embodiment, the CPORT 216 may include a PCI (Peripheral Component Interconnect) 222 interface to enable the switch element 120 to communicate with the processor 224 and a memory 226. The processor 224 controls overall switch element operations, and the memory 226 stores firmware instructions 228 for controlling switch element 120 operations.

The CPORT 216 includes an input buffer (CBUFI) 218, which is used to transmit frames from the processor 224 to the ports 128. The CPORT 216 further includes an output buffer (CBUFO) 220, which is used to send frames from the PBUFs 204, the TBUFs 206, and CBUFI 218 to the processor 224.

Port 128 described above may be referred to as a "base port" that may have more than one network link available for receiving and transmitting information. Each network link allows the base port to be configured into a plurality of independently operating sub-ports, each uniquely identified for receiving and sending frames. The configuration may vary based on protocol and transfer rates. For example, port 128 may be configured to operate as four single lane Ethernet ports, three single lane Ethernet ports and one single lane Fibre Channel port, two single lane Ethernet ports and two single lane Fibre Channel ports, one single lane Ethernet port and three single lane Fibre Channel port, four single lane Fibre Channel port, two double lane Ethernet ports, 1 double lane Ethernet port and two single lane Ethernet ports, one double lane Ethernet port, one single lane Ethernet port and one single lane Fibre Channel port, one double lane Ethernet port and two single lane Fibre Channel port, one four lane Ethernet port or one four lane Fibre Channel port. Port 128 uses some logic that is shared among the multiple sub-ports and some logic that is dedicated to each sub-port.

Figure 2B:
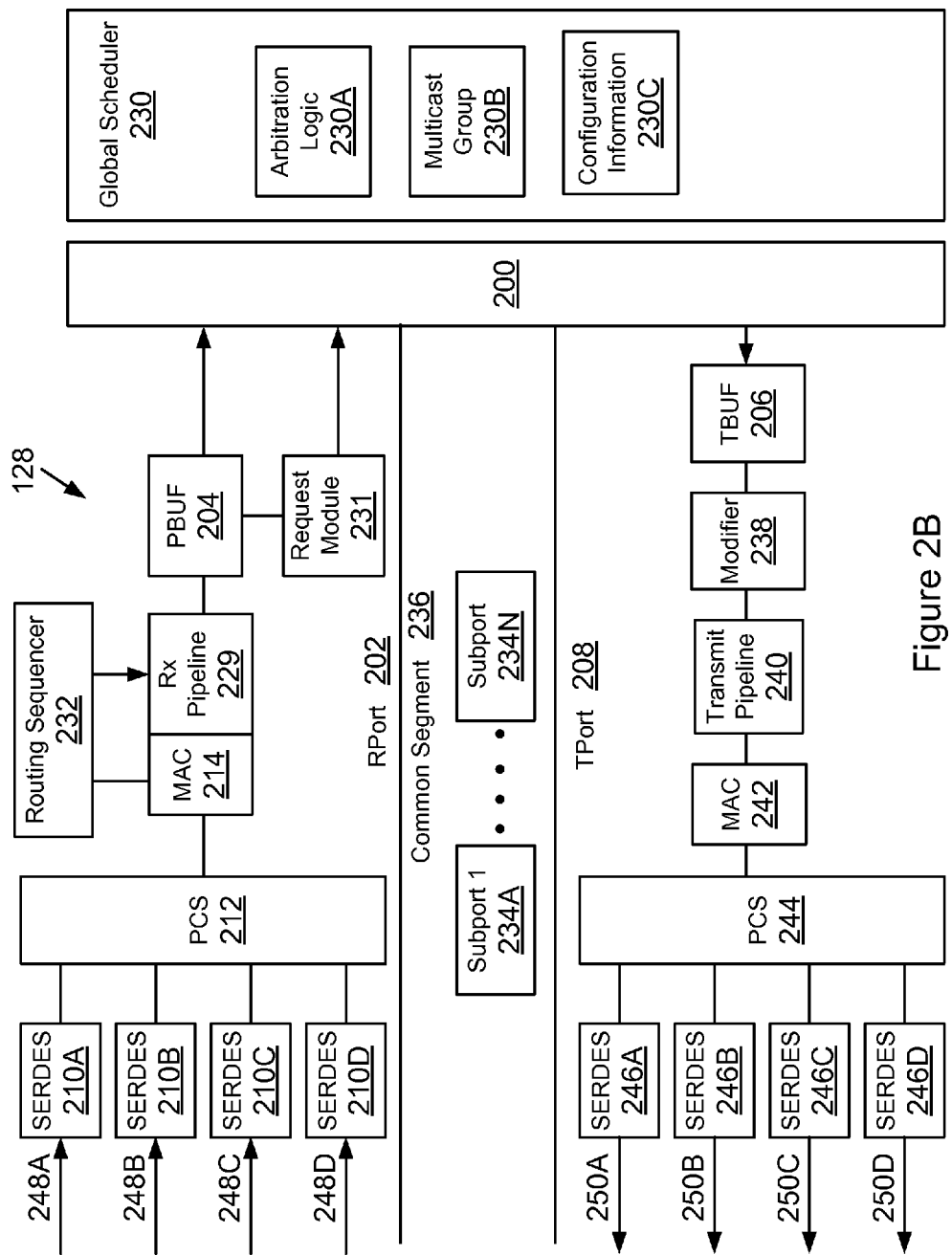
FIG. 2B shows a block diagram of a base-port of the switch of FIG. 2A.

FIG. 2B shows an example of base port 128 having RPORT 202, TPORT 208, and a common segment 236, according to one embodiment. RPORT 202 is used for receiving and processing frames, while TPORT 208 is used for transmitting frames. Common segment 236 is used to store configuration and status information that may be commonly used among different components of base port 128. In one embodiment, base port 128 may be configured to include a plurality of sub-ports. The configuration, status, and statistics information/logic 234A-234N for each sub-port may be stored in common segment 236. The configuration logic 234A-234N may include look up tables or other data structures for storing configuration information.

RPORT 202 may include or be coupled to a plurality of network links, for example, four independent physical network links (or lanes) 248A-248D, each configured to operate as a portion of an independent sub-port within base port 128. Each network link is coupled to a SERDES 210A-210D, all of which share PCS 212 and MAC 214. The multiple lanes also share a receive pipeline 229 that is used for pre-processing received frames before they are transferred. Both MAC 214 and receive pipelines 229 are time multiplexed so that they can be shared among the plurality of links based on how the ports are configured to operate. In one embodiment, PCS 212 and MAC 214 may be a part of the receive pipeline 229.

Incoming frames are received via one of the network links 248A-248D. A received frame is processed by the appropriate SERDES and then sent to the PCS 212. After PCS 212 processes the frame, the frame is provided to MAC 212 that is time-shared among a plurality of sub-ports. Thus, for a certain time segment (for example, a clock cycle), MAC 214 may be used by one of the sub-ports. After the MAC 212 processes the frame it is sent to receive pipeline 229 that is also time-shared.

Information regarding the frame or a copy of the frame is also provided to a routing sequencer (or module) 232 that determines a destination for the received frame. In one embodiment, a frame whose destination is processor 224 is given the highest priority, followed by a frame that is routed by a ternary content addressable memory (TCAM) or steering registers located within the routing sequencer 232. More than one routing sequencer 232 may be used for each base port 128. Frames that are ready to be sent out are staged at PBUF 204. PBUF 204 may have a plurality of queues (or slots) that may be referred to as receive queues. The receive queues temporarily store frames, until a request to move each frame is granted.

To move frames from the receive queues, a request module 231 generates requests for a global scheduler 230, also referred to as scheduler 230. Request module 231 maintains a data structure (not shown) that tracks a number of requests that may be pending for each sub-port. Request module 231 also removes requests from the data structure when a grant is received for a particular request.

Scheduler 230 includes arbitration logic 230A that performs dual stage arbitration for requests from various base ports. Scheduler 230 also maintains a data structure at a memory labeled as multicast group 230B. The data structure stores information for identifying multicast groups that may receive multicast frames, e.g., frames that are destined to multiple destinations. Scheduler 230 also stores configuration information 230C for various ports and some of that information may be used to select requests.

Frames for transmission via TPORT 208 move via TBUF 206 and a modifier 238. In one embodiment, modifier 238 may be used to insert or remove information from an outgoing frame. The modification may be based on the frame type. The time-shared transmit pipeline 240 and MAC 242 are used to process outgoing frames. MAC 242 may be a part of transmit pipeline 240. PCS 244, SERDES 246A-246D are used similarly to PCS 212 and SERDES 210A-210D. Network links 250A-250D are similar to links 248A-248D, except links 250A-250D are used to transmit frames. Furthermore, although separate MAC and PCS are shown for the transmit segment, the same PCS 212 and MAC 214 of the receive segment may be used in the transmit segment.

Figure 3:
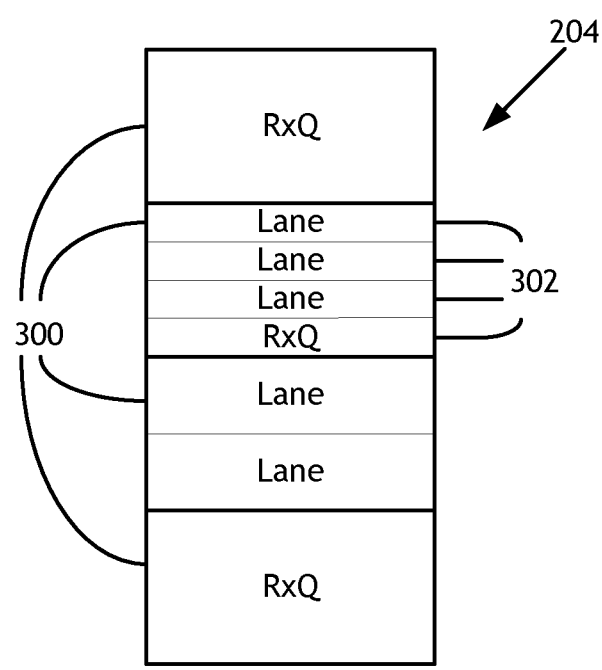
FIG. 3 is a functional block diagram of a receive buffer of the switch of FIG. 2.

FIG. 3 shows an example of PBUF 204, according to one embodiment. The PBUF 204 is subdivided into a plurality of receive queues 300. In the illustrated embodiment, four receive queues 300 are shown, but any number could be provided. Each of the receive queues 300 may correspond to one of the sub-ports of port 128, and stores received data for that sub-port. Each receive queue 300 may also be subdivided into two, four, eight or more lanes 302.

A typical network switch has a fixed number of receive queues and a fixed size for each receive queue. This arrangement does not allow for efficient use of the receive buffers. In the present embodiments, the number and size of the receive packet queues 300 are programmed by firmware. The number of receive queues 300 for a given port is programmable from 1 to 4. The size of each receive queue 300 is programmable based on how many ports are being serviced by the common receive buffer, and based on how many queues 300 are configured for each base port 128. In one embodiment, the receive queue size is adjusted to provide additional storage for one or more sub-ports when support for longer distance links is needed. The size of one receive queue is increased by reducing the size of one or more other queues. The amount that a receive queue can be reduced may, for example, be determined by firmware 228 after analyzing port configuration information.

The receive buffer disclosed herein, PBUF 204, provides the receive buffer queues 300 for up to four receive sub-ports or as few as one sub-port. The number depends on how many lanes 302 are needed for a programmed link rate and protocol. Firmware 228 can program the port 128 according to at least eleven different configurations. Each of these eleven configurations may operate at different link rates. The eleven configurations are:

4 single-lane Ethernet ports;
3 single-lane Ethernet ports and 1 single-lane FC port;
2 single-lane Ethernet ports and 2 single-lane FC ports;
1 single-lane Ethernet port and 3 single-lane FC ports;
4 single-lane FC ports;
2 double-lane Ethernet ports;
1 double-lane Ethernet port and 2 single-lane Ethernet ports;
1 double-lane Ethernet port and 1 single-lane Ethernet port and 1 single-lane FC port;
1 double-lane Ethernet port and 2 single-lane FC ports;
1 quad-lane Ethernet port; and
1 quad-lane FC port.

Figure 4A:
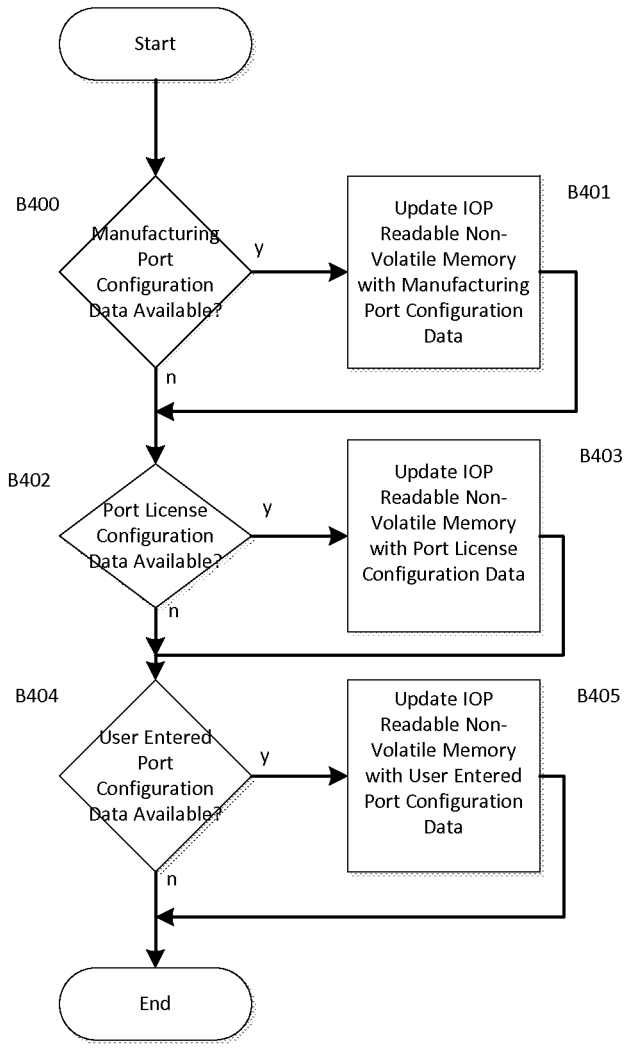
FIG. 4A is a flowchart illustrating one embodiment of the present methods for gathering port configuration data.

FIG. 4A illustrates a process for gathering port configuration data, according to the present embodiments. This process may be executed by a management application (not shown) that is executed by a computing system, similar to computing system 102. At block B400, the process determines if there is any port configuration data available from the time when the switch 120 was manufactured. For example, this data may be stored in the memory 226. The configuration data may include information about the various base-port configurations listed above. Some of the port configurations may not be allowed. The configuration data may include link rate, link protocol, or flow control information that may be used to configure the port 128. The manufacturing port configuration data could also include data specific to a switch product. The product-specific data can identify port configuration data based on how and where the product will be used. For example, in some cases, the product may only need to be configured for Fibre Channel ports. In other cases, specific ports will only be configured for single-lane Ethernet ports.

If the answer to the query at block B400 is yes, then the process advances to block B401, where readable non-volatile memory 226 is updated with the manufacturing port configuration data. The process then advances to block B402. If at block B400, the process determines that no manufacturing port configuration data is available, the process advances to block B402.

At block B402, the process determines if there is any port license configuration data available. A special product license may be needed for some port configurations for some products that use the switch element. For example a special product license may be required to enable one or more ports for specific configurations and operating speeds.

If the answer at block B402 is yes, then the process advances to block B403, where memory 226 is updated with the licensing port configuration data. The process then advances to block B404. If the answer at block B402 is no, then the process advances to block B404.

At block B404, the process determines if there is any user-entered port configuration data. This data could be supplied through a connection to a computing system, or entered by a user such as through a computing system 102, 122, or any other device that allows keyboard or some other form of user data via an out-of-band connection to processor 224.

If the answer at block B404 is yes, then the process advances to block B405, where memory 226 is updated with the user-entered port configuration data. The process then ends. If the answer at block B404 is no, then the process ends. The port configuration data that is stored in memory 226 is read by processor 224 after an event occurs. An example of an event is a port reset, a full switch element reset, a processor reset, or a switch chassis system power-up. The embodiments disclosed herein are of course not limited to any particular event.

Figure 4B:
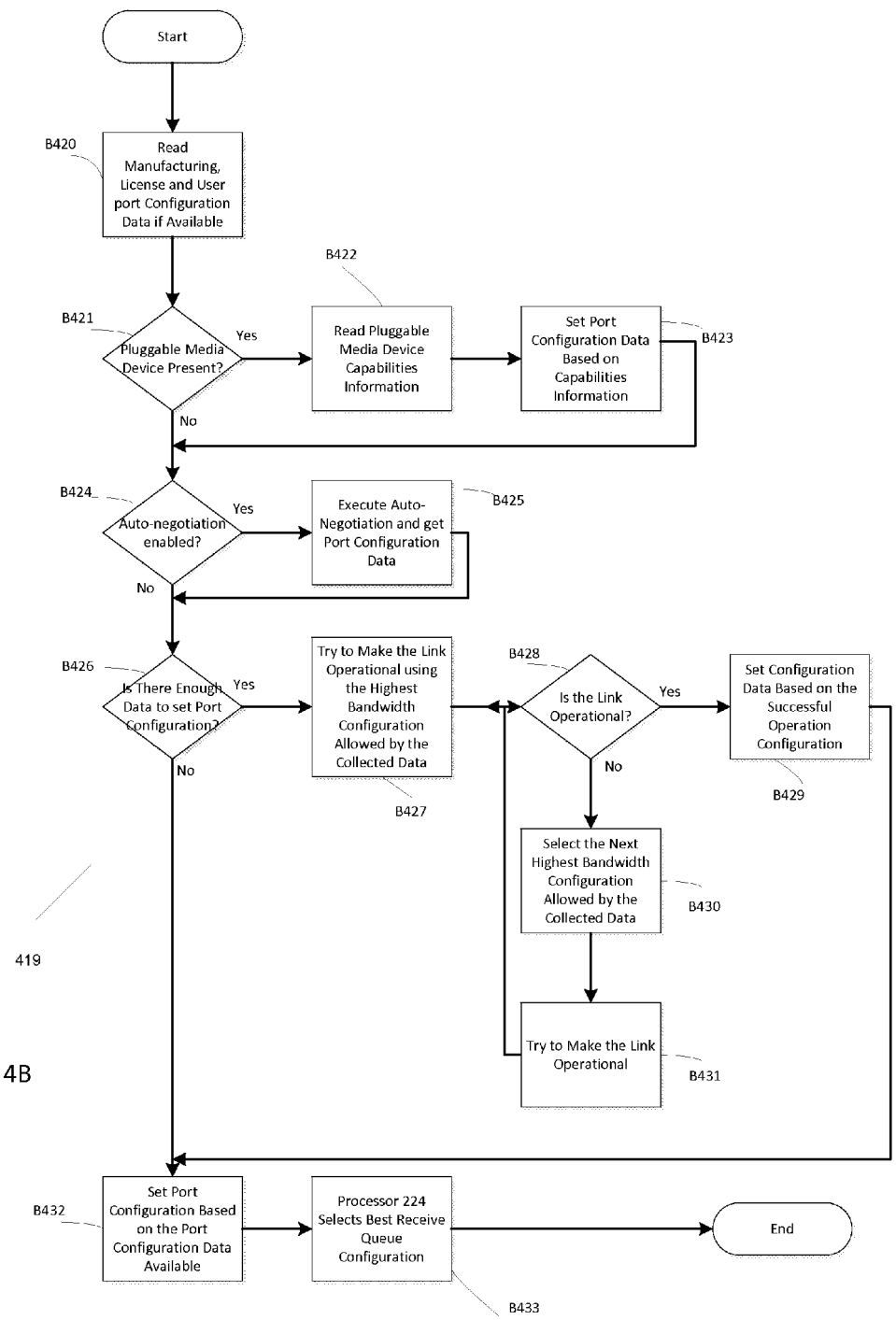
FIG. 4B is a flowchart illustrating one embodiment of the present methods for configuring ports including receive packet queues.

FIG. 4B illustrates a process 419 for setting a port configuration, according to the present embodiments. The process 419 may be executed after an event or any time a port has to be configured. The process 419 begins at block B420 when processor 224 reads manufacturing, license, and user port configuration data, if available. The foregoing terms have been described above with respect to FIG. 4A. At block B421, processor 224 determines if an external pluggable media is present. The pluggable media (not shown) may be provided via a connection/slot of switch 120. The term pluggable media in this context means a small factor pluggable (SFP) transceiver that is coupled on one side to a switch port and on another side to a networking cable or a Fibre. There are various types of SFPs that can be selected by a user based on speed, link type, and protocol. The embodiments disclosed herein are not limited to any particular SFP or pluggable media type. Details of providing the pluggable media are not germane to the embodiments disclosed herein.

If an external media device is present, then at block B422 the processor 224 reads the pluggable media device. In one embodiment, the pluggable media device may be used to store "capabilities information," e.g. an operating link rate and protocol used for communication (for example, Ethernet, Fibre Channel, etc.). Based on the capability information, port configuration data is set at block B423. Thereafter, the process moves to block B424. If the answer to the query at block B421 is no, the process moves to block B424.

At block B424, the processor 224 determines if "auto-negotiation" is enabled at port 128. Auto-negotiation is typically a capability of a switch port to exchange information with another port. The manner in which auto-negotiation is performed is typically specified by a protocol, for example, Ethernet, FCoE or Fibre Channel. If yes, then at block B425, auto-negotiation is executed and port configuration data is obtained by the negotiating ports. If no, the process moves to block B426.

At block B426, processor 224 determines if there is enough data to set port configuration. For example, the link rate and the protocol type may be enough data to set port configuration. If yes, then at block B427 an attempt is made to configure the port to operate by using the highest bandwidth configuration that is allowed based on the collected data. The collected data may be from the manufacturing data or user license information, for example. At block B428, the process determines if a link connected to port 128 is operational. If yes, then configuration data is set based on the successful operation at block B427.

If the link is not operational, then at block B430, the next highest available bandwidth is selected. At block B431, another attempt is made to make the link operational, similar to block B427, and the process moves to block B428.

If at block B426 there is not enough data to set the port configuration, then at block B432 port configuration is set based on the available port configuration data. The optimal receive queue configuration is then selected by processor 224 at block B433 and the process ends.

Figure 5A:
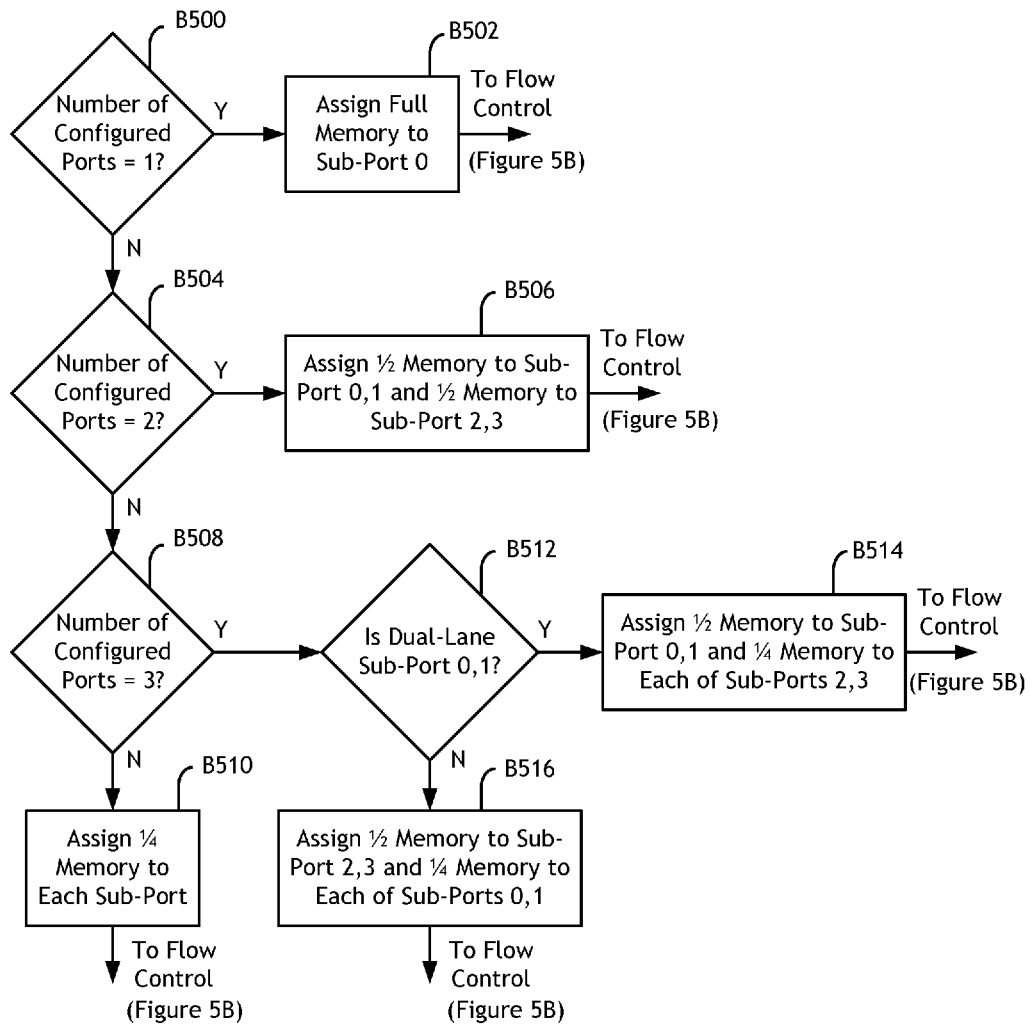
FIG. 5A is a flowchart illustrating one embodiment of the present methods for selecting a best configuration for a port.
Figure 5B:
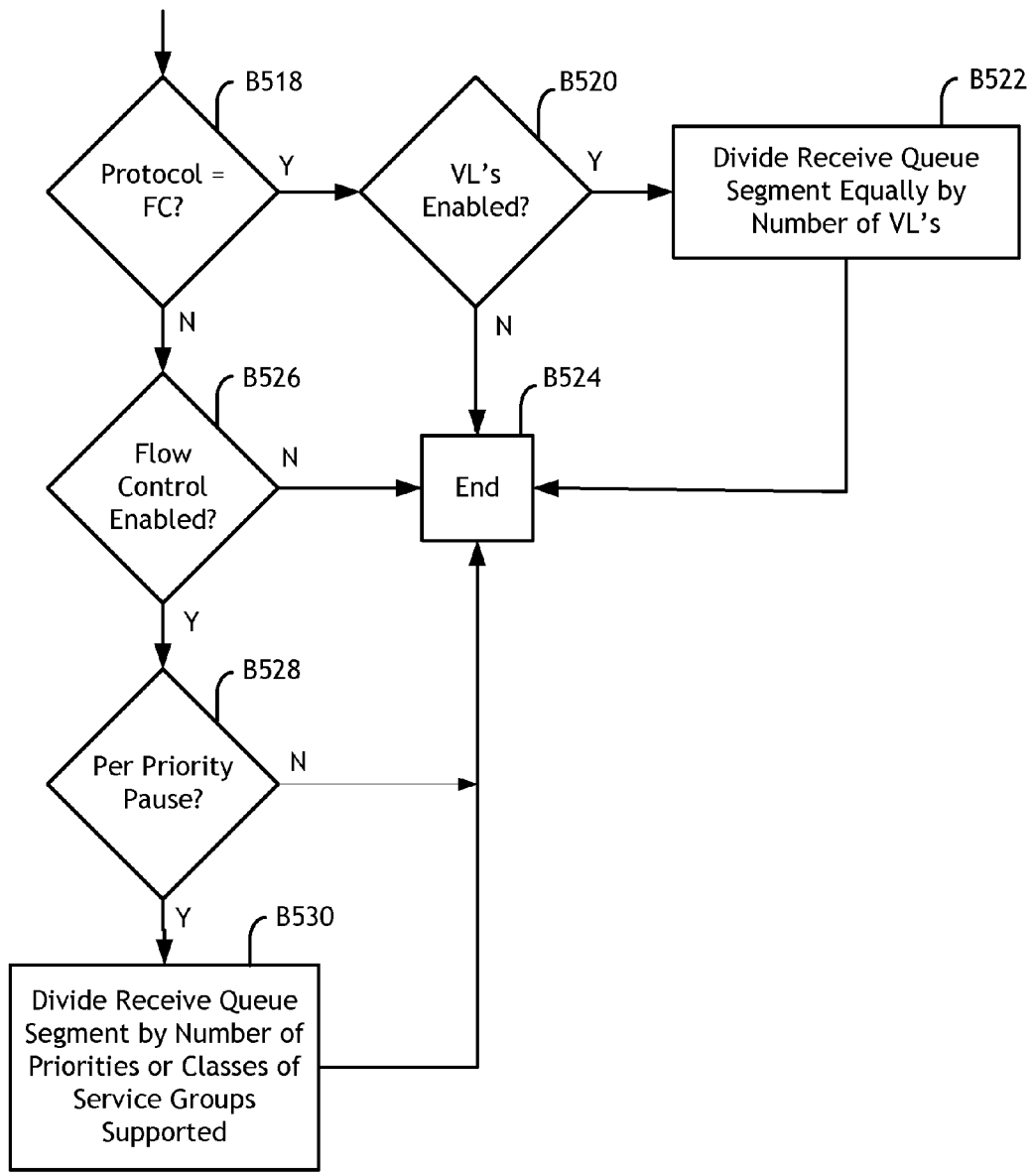
FIG. 5B is a flowchart illustrating one embodiment of the present methods for determining flow control for a port.

FIGS. 5A and 5B are flowcharts illustrating a machine implemented, process for selecting a best configuration for a port (block B433 in FIG. 4B), according to the present embodiments. As an example, assume that base port 128 can be configured into four sub-ports that may be designated as sub-port 0, 1, 2 and 3.

At block B500 the process determines whether the number of configured ports is equal to one. This number may be discovered using the processes of FIGS. 4A and 4B, for example. If the answer is yes, then the process advances to block B502, where the full memory is assigned to sub-port 0. The process then advances to flow control, which is described below with respect to FIG. 5B.

If, at block B500, the process determines that the number of configured ports is not equal to one, then the process advances to block B504, where the process determines whether the number of configured ports is equal to two. If the answer is yes, then the process advances to block B506, where one-half of the total memory is assigned to sub-ports 0, 1 and one-half of the total memory is assigned to sub-ports 2, 3. The process then advances to flow control (FIG. 5B).

If, at block B504, the process determines that the number of configured ports is not equal to two, then the process advances to block B508, where the process determines whether the number of configured ports is equal to three. If the answer is no, then the process advances to block B510, where one-quarter of the total memory is assigned to each of the four sub-ports. The process then advances to flow control (FIG. 5B). However, if the answer is yes, then the process advances to block B512. At block B512, the process determines whether sub-port 0,1 is a dual-lane sub-port. If the answer is yes, then the process advances to block B514, where one-half of the total memory is assigned to sub-port 0,1 and one-quarter of the total memory is assigned to each of sub-ports 2,3. The process then advances to flow control (FIG. 5B). However, if the answer is no, then the process advances to block B516, where one-half of the total memory is assigned to sub-port 2,3 and one-quarter of the total memory is assigned to each of sub-ports 0,1. The process then advances to flow control (FIG. 5B).

The type of flow control that is used on a link can be determined in a number of ways. One way is for it to be included in the port configuration data that is stored in some IOP readable memory. A second way is through an information exchange between the link partners. For example, when using Fibre Channel protocol, the link is first established between the switch element and some other device, including another switch element. There is an exchange of information that includes the type of flow control to use; no virtual lanes or virtual lanes. This exchange also includes the number of receive credits available on the link. The link is then reset with the understanding on both ends of how it will be configured when it comes out of the reset sequence. An Ethernet protocol port goes through a similar process to exchange link configuration information. This exchange may be, for example, part of the auto-negotiation process outlined by the IEEE Standard under clauses 37 and 73.

With reference to FIG. 5B, the process for determining a flow control scheme begins at block B518, where it is determined whether the protocol being used is Fibre Channel. If the answer is yes, then the process advances to block B520, where it is determined whether virtual lanes (VL's) are enabled. VLs are used per the Fibre Channel standards and allow a physical link to be used among multiple VLs. Storage space at a receive segment of a port is allocated to each VL. Details regarding VLs are not germane to the embodiments disclosed herein.

If the answer at block B520 is yes, then the process advances to block B522, where the receive queue segment is divided equally by the number of VL's. The process then advances to block B524, where the process ends. However, if the answer at block B520 is no, then the process skips block B522 and advances directly to block B524, where the process ends, because there is no point to dividing the receive queue if VL's are not enabled.

If at block B518 the answer is that the protocol being used is not FC, then the process advances to block B526, where it is determined whether flow control is enabled. If the answer is no, then the process advances to block B524, where the process ends, because there is no point to dividing the receive queue if flow control is not enabled. However, if the answer is yes, then the process advances to block B528, where it is determined whether Per Priority Flow Control is in effect. The Per Priority Flow Control protocol is defined in the IEEE 802.1Qbb standard and provides a link-level flow control mechanism that can be controlled independently for each Class of Service (CoS) that is defined by the IEEE P802.1p standard. If the answer at block B528 is no, then the process advances to block B524, where the process ends, because there is no point to dividing the receive queue if Per Priority Flow Control is not in effect. However, if the answer is yes, then the process advances to block B530, where the receive queue segment is divided by the number of priorities or classes of service supported.

The present embodiments advantageously enable the ports 128 to be configured for the most efficient use of resources. Under most normal conditions it is desirable to provide the largest amount of receive queue storage as possible. All other things being equal, having a larger receive queue will result in increased bandwidth across the link.

In yet another embodiment, the size of the receive queues is not equally distributed based on the port configuration and flow control employed. The receive queue for one or more ports is increased while one or more other ports correspondingly have their receive queues reduced. The total amount of storage available does not change, so if more is assigned to one port, then one or more other ports must be reduced. The condition when unequal receive queues are likely to lead to increased link bandwidth is when one or more, but not all, of the links are over a long distance.

The above description presents the best mode contemplated for carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above that are fully equivalent. For example, the foregoing embodiments may be implemented in adapters and other network devices. Consequently, this invention is not limited to the particular embodiments disclosed. On the contrary, this invention covers all modifications and alternate constructions coming within the spirit and scope of the invention as generally expressed by the following claims, which particularly point out and distinctly claim the subject matter of the invention.

What is claimed is:

1. A machine-implemented method for a port of a network device communicating with another network device port, the method comprising:
    reading manufacturing, license and user provided port configuration data by a processor of the network device;
    obtaining capabilities information for the port by the processor of the network device from an external pluggable media device, when the external pluggable media device is present;
    setting port configuration data based on the capabilities information obtained from the external pluggable media;
    executing auto-negotiation on the port, when enabled and obtaining configuration data from the other port;
    determining that enough data is available to set port configuration;
    attempting to configure the port by using a highest permissible bandwidth configuration when enough data is available to set the port configuration; and
    setting port configuration based on the attempt to configure the port to operate when a link connected to the port is operational.

2. The method of claim 1, wherein the external pluggable media is provided via a connection or slot of the network device.

3. The method of claim 1, wherein the external pluggable media device stores an operating link rate and a protocol used for communication.

4. The method of claim 1, wherein the external pluggable media device is a small factor pluggable (SFP) transceiver that is coupled on one side to the port of the network device and on another side to a networking cable or a Fibre.

5. The method of claim 1, wherein a link rate and a protocol type are used to set the port configuration.

6. The method of claim 1, wherein when the link is not operational, selecting a next highest available bandwidth and attempting to configure the port to operate by using the next highest available bandwidth.

7. A non-transitory, machine readable storage medium having stored thereon instructions for performing a method for a port of a network device communicating with another network device port, comprising machine executable code which when executed by at least one machine, causes the machine to:
- read manufacturing, license and user provided port configuration data by a processor of the network device;
- obtain capabilities information for the port by the processor of the network device from an external pluggable media device, when the external pluggable media device is present;
- set port configuration data based on the capabilities information obtained from the external pluggable media;
- execute auto-negotiation on the port, when enabled and obtaining configuration data from the other port;
- determine that enough data is available to set port configuration;
- attempt to configure the port by using a highest permissible bandwidth configuration when enough data is available to set the port configuration; and
- set port configuration based on the attempt to configure the port to operate when a link connected to the port is operational.

8. The storage medium of claim 7, wherein the external pluggable media is provided via a connection or slot of the network device.

9. The storage medium of claim 7, wherein the external pluggable media device stores an operating link rate and a protocol used for communication.

10. The storage medium of claim 7, wherein the external pluggable media device is a small factor pluggable (SFP) transceiver that is coupled on one side to the port of the network device and on another side to a networking cable or a Fibre.

11. The storage medium of claim 7, wherein a link rate and a protocol type are used to set the port configuration.

12. The storage medium of claim 7, wherein when the link is not operational, selecting a next highest available bandwidth and attempting to configure the port to operate by using the next highest available bandwidth.

13. A network device, comprising:
- a port communicating with another port of another network device; and
- a processor executing machine executable instructions to:
  - read manufacturing, license and user provided port configuration data;
  - obtain capabilities information for the port from an external pluggable media device, when the external pluggable media device is present;
  - set port configuration data based on the capabilities information obtained from the external pluggable media;
  - execute auto-negotiation on the port, when enabled and obtaining configuration data from the other port;
  - determine that enough data is available to set port configuration;
  - attempt to configure the port by using a highest permissible bandwidth configuration when enough data is available to set the port configuration; and
  - set port configuration based on the attempt to configure the port to operate when a link connected to the port is operational.

14. The network device of claim 13, wherein the external pluggable media is provided via a connection or slot of the network device.

15. The network device of claim 13, wherein the external pluggable media device stores an operating link rate and a protocol used for communication.

16. The network device of claim 13, wherein the external pluggable media device is a small factor pluggable (SFP) transceiver that is coupled on one side to the port of the network device and on another side to a networking cable or a Fibre.

17. The network device of claim 13, wherein a link rate and a protocol type are sufficient to set the port configuration.

18. The network device of claim 13, wherein when the link is not operational, selecting a next highest available bandwidth and attempting to configure the port to operate by using the next highest available bandwidth.

19. The network device of claim 13, wherein the network device is a switch element.

20. The network device of claim 13, wherein the network device is a network adapter.

* * * * *